(12) United States Patent
Sebestyen

(10) Patent No.: US 6,246,490 B1
(45) Date of Patent: Jun. 12, 2001

(54) METHOD AND ARRANGEMENT FOR THE TRANSMISSION OF FACSIMILE-ENCODED INFORMATION BETWEEN MULTIMEDIA-CAPABLE COMMUNICATION TERMINAL EQUIPMENT

(75) Inventor: Istvan Sebestyen, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/836,995

(22) PCT Filed: Nov. 13, 1995

(86) PCT No.: PCT/DE95/01564

§ 371 Date: May 12, 1997

§ 102(e) Date: May 12, 1997

(87) PCT Pub. No.: WO96/15628

PCT Pub. Date: May 23, 1996

(30) Foreign Application Priority Data

Mar. 13, 1995 (DE) .............................. 195 09 022
Nov. 11, 1995 (DE) .............................. 44 40 402

(51) Int. Cl.⁷ ............................... H04N 1/00; H04J 3/16
(52) U.S. Cl. ............................................ 358/425; 370/469
(58) Field of Search ..................... 358/425, 467, 358/400, 401, 405, 406, 435, 434, 442, 468; 370/468, 477, 535, 522, 469, 471, 473; 375/222

(56) References Cited

U.S. PATENT DOCUMENTS

| Re. 35,740 | * | 3/1998 | Piasecki et al. ............... 379/100 |
| 5,283,638 | | 2/1994 | Engberg et al. ............... 348/14 |
| 5,283,819 | * | 2/1994 | Glick et al. ............... 379/90 |
| 5,367,522 | * | 11/1994 | Otani ............... 370/84 |
| 5,526,350 | * | 6/1996 | Gittins et al. ............... 370/58.1 |
| 5,574,724 | * | 11/1996 | Bales et al. ............... 370/68.1 |
| 5,600,844 | * | 2/1997 | Shaw et al. ............... 395/800 |
| 5,657,134 | * | 8/1997 | Numata et al. ............... 358/425 |
| 5,682,386 | * | 10/1997 | Arimiili et al. ............... 370/468 |
| 5,754,687 | * | 5/1998 | Fujimori et al. ............... 382/190 |
| 5,920,661 | * | 7/1999 | Mori et al. ............... 382/317 |

FOREIGN PATENT DOCUMENTS

WO 92/02100   2/1992 (WO).
WO 92/21211   11/1992 (WO).

OTHER PUBLICATIONS

Fifth Nordic Seminar on Digital Mobile Communications, The Siemens D900 solution for Fax Group 3 support in the Interworking Function, I. Dittrich, pp. 55–62, XP 000457835, Dec. 3, 1992.

Fujitsu–Scientific and Technical Journal, Bd. 28, Nr. 2, pp. 172–179, XP 000312058, "Multimedia Communication Technology", Imai et al., Jan. 1, 1992.

Patent Abstracts of Japan, vol. 16, No. 441, JP 4154251, Sep. 14, 1992.

* cited by examiner

Primary Examiner—Madeleine Nguyen
(74) Attorney, Agent, or Firm—Hill & Simpson

(57) ABSTRACT

A method and apparatus for the transmission of facsimile-encoded information from a sending communication terminal equipment via a communication network to a receiving communication terminal equipment employs facsimile transmission protocols includes steps of: compressing information in the sending communication terminal equipment; dividing the compressed, facsimile-encoded information in a facsimile adaption layer and matching the information to the multimedia packet multiplex layer;

each facsimile data block is handed over to the multiplex layer identified as facsimile information data block; and all information data blocks are multiplexed by the sending communication terminal equipment with other information data blocks for voice, video, data, etc., are transmitted to the receiving communication terminal equipment and demultiplexed therein.

2 Claims, 3 Drawing Sheets

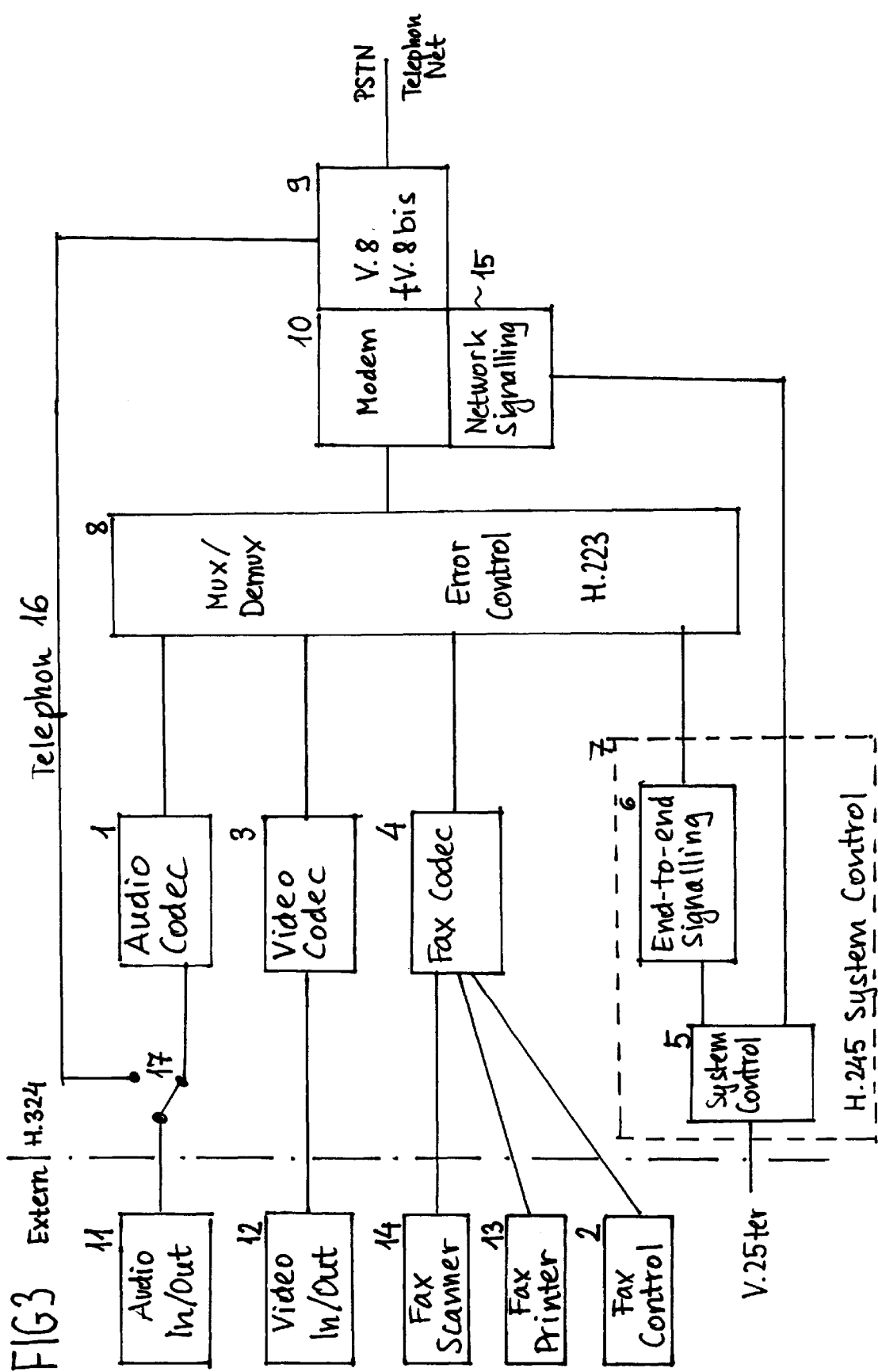

METHOD AND ARRANGEMENT FOR THE TRANSMISSION OF FACSIMILE-ENCODED INFORMATION BETWEEN MULTIMEDIA-CAPABLE COMMUNICATION TERMINAL EQUIPMENT

BACKGROUND OF THE INVENTION

1. Field of the Invention

The present invention relates generally to the field of telecommunications systems, and, more particularly, the present invention is directed to methods and apparatus for transmitting facsimile-encoded information between multimedia-capable communication terminal equipment.

2. Description of the Related Art

In the field of telecommunications, the transmission of data, video and audio signals is accomplished according to communications protocols such as, ITU-T H.223 or, alternatively, H.245 (the November 1995 version is referenced). In particular, the terminal equipment of telefax group 3 connectable to a communication network via analog interfaces are used mainly for the transmission of digital still pictures. The still pictures to be communicated over the telecommunication networks are comprised of a large number of minute black and white mosaic squares of the same shape and size (called pixels). The original still pictures are either scanned by a scanner and resolved into black or white pixels or are generated by a computer as the result of a document/drawing production. First, they are compressed in order to reduce the necessary amount of information to be transmitted. Then they are divided into information blocks and communicated block-by-block via the telecommunication network. In the receiving telefax terminal equipment, the received information is decompressed and decoded into the original black and white pixels. Thus, an image that looks like the original is compiled (and therefore represents a "facsimile" thereof). The received image is usually printed out on paper by the receiving terminal equipment or, in some cases, is presented on a display picture screen or stored on local digital storage devices such as, for example, a magnetic disk.

The method employed by terminal equipment of telefax group 3 has been standardized according to the International Telecommunication Union (ITU) in the corresponding ITU-T recommendations for group 3 (ITU-T T.4, ITU-T T.6, ITU-T T.30) (latest revision 1995 to date). A facsimile group 3 device is usually a "monomedia" communication terminal equipment, i.e. it can normally only transmit one specific type of information (namely, a facsimile pixel image).

In contrast, multimedia-capable communication terminal equipment are capable of simultaneously transmitting two types of information such as, for example, a facsimile pixel image accompanied with voice.

SUMMARY OF THE INVENTION

An object of the present invention is to specify a method which is easily realized for facsimile image transmission in the framework of a multimedia communication system via a communication network that enables the realization of auxiliary communication services regardless of whether the communication terminal equipment are connected to the communication network via analog or digital interfaces. Another object of the present invention is to set forth specific structures for implementation of such a method.

DESCRIPTION OF THE DRAWINGS

The invention is explained in greater detail below with reference to the FIGS. wherein:

FIG. 3 is a block diagram illustration of an exemplary embodiment of a facsimile device for implementing the inventive methods.

DESCRIPTION OF THE PREFERRED EMBODIMENTS

Rather than employing known half-duplex or full-duplex (T.30 Annex C) protocol according to ITU-T T.30 in the information stream communicated between telefax terminal equipment, it is proposed to employ a new full-duplex protocol according to "Packet Media Mode" of the ITU PSTN/mobile picture telephone (ITU-T H.324 or, respectively, ITU-T H.32P/M series of ITU-T recommendations) in which the facsimile protocol according to ITU-T T.30 is multiplexed with voice (encoded, for example, according to ITU-T G.723, G.729 or G.dsvd) in accordance with ITU-T H.223. The control, i.e. opening, transmitting and closing the facsimile channels, takes place with the assistance of an ITU-T multimedia channel controller operating according to ITU-T H.245.

Figure 1:
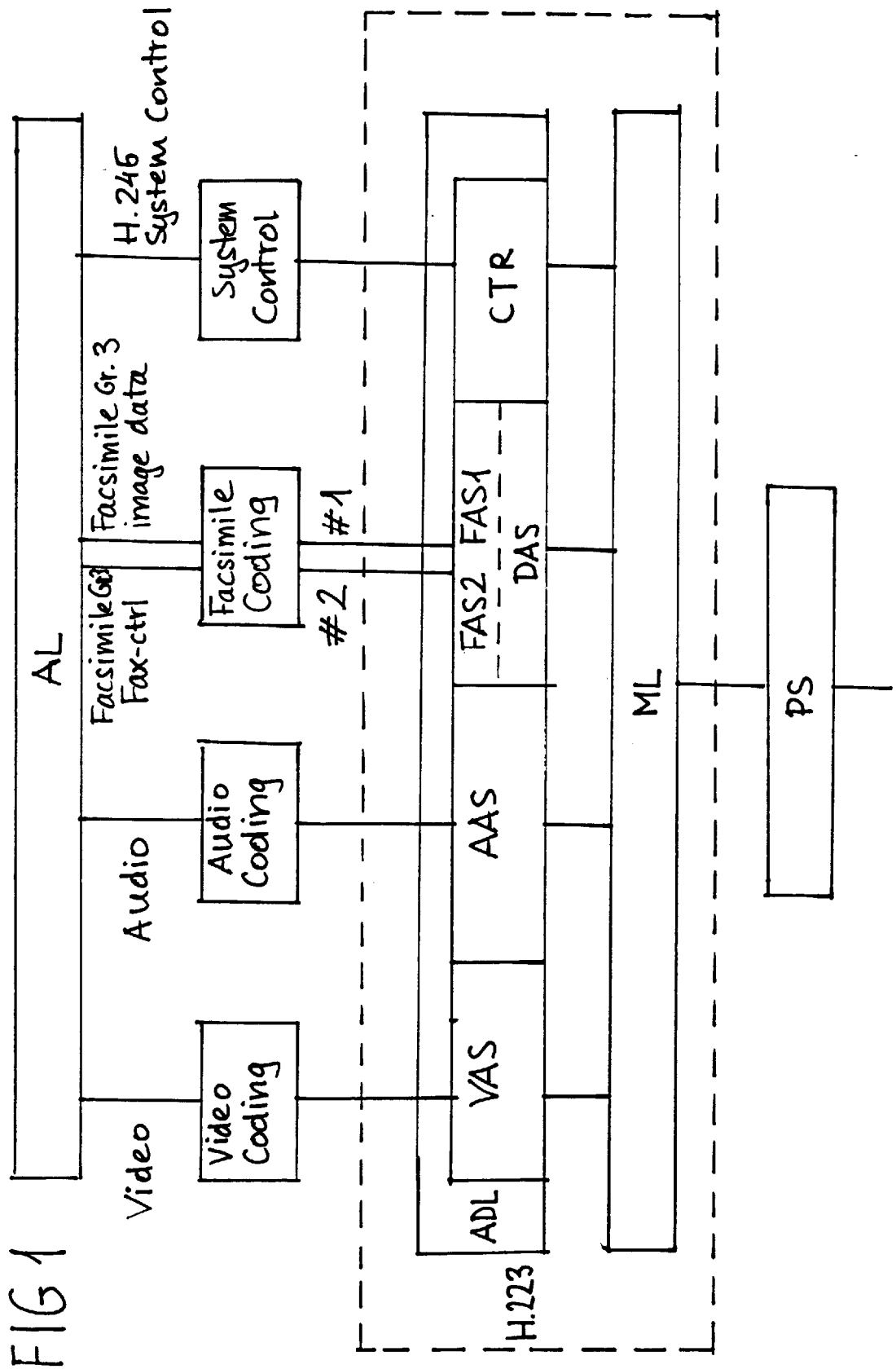
FIG. 1 illustrates the protocol layers of the multimedia facsimile device and method.

One novel method for the transmission of facsimile-encoded information from a sending communication terminal equipment via a communication network to a receiving communication terminal equipment in accordance with the facsimile transmission protocol according to ITU-T T.4 and ITU-T T.30 and of a flexible PSTN/mobile picture telephone protocol (ITU-T H.223) with respect to the user channels may employ following method steps given facsimile group 3 transmission with half-duplex facsimile protocol according to ITU-T T.30:

1a) digital facsimile input information is compressed in the sending communication terminal equipment;

1b) facsimile-encoded (according to ITU-T T.4, T.6) information is divided by a facsimile matching layer and matched to the multimedia packet multiplex layer lying therebelow (FIG. 1). For this step, two data channels (data channel #1 and #2) are allocated and opened in accordance with ITU-T H.245. Data channel #2 is used as a full-duplex channel for the transmission of the facsimile control data according to ITU-T T.30. In addition to other signals, the device parameters and the shared transmission parameters (for example, image resolution, facsimile compression method, error correction method, facsimile transmission or reception) are exchanged in this data channel. These items are selected and set, and the successful or unsuccessful transmission of the page and/or the facsimile transmission is confirmed. Communication terminates after transmission of the facsimile message and the control is returned to ITU-T H.245. Data channel #1 is allocated and opened as half-duplex channel for the transmission of the facsimile encoded data. According to the settings, the facsimile data are encoded and sent over data channel #2.

1c) Each data block of data channel #2 and #1 is handed over to the multiplex layer and identified as a facsimile information control block or, alternatively, a facsimile information data block;

1d) All information data blocks are multiplexed by the sending communication terminal equipment possibly with other information data blocks for voice, video, data, etc. if they exist, with the assistance of the multiplex layer operating in accordance with a PSTN/mobile picture telephone protocol adapted with ITU-T H.223. These are transmitted to the receiving communication terminal equipment and demultiplexed therein;

1e) The demultiplexed information data blocks are respectively assigned to a matching layer allocated to the information data type of video, voice, data or facsimile. The facsimile matching layer forwards the facsimile information blocks to the data channels #1 and #2 of the receiver for application of a facsimile decompression method in accordance with ITU-T T.4, T.6, T.30, and the decompressed facsimile information is output or further-processed. Here as well as in the cases described below, the facsimile matching layer can also be part of a data matching layer.

2) The following method steps can be employed given facsimile group 3 transmission with the new, optional full-duplex facsimile protocol in accordance with ITU-T T.30 Annex C:

2a) digital facsimile input information is compressed in the sending communication terminal equipment;

2b) facsimile-encoded (according to ITU-T T.4, T.6) information is divided by a facsimile matching layer and matched to the multimedia packet multiplex layer lying therebelow (FIG. 1). For this step, only one data channel (data channel #1) is allocated and opened in accordance with ITU-T H.245. Data channel #1 is also used as a full-duplex channel for the transmission of facsimile control data in accordance with ITU-T T.30 Annex C. In addition to other signals, the device parameters and the shared transmission parameters (for example, image resolution, facsimile compression method, error correction method, facsimile transmission or reception) are exchanged in this data channel, selected and set; successful/or unsuccessful transmission of the page and/or the facsimile transmission is confirmed; communication is terminated after transmission of the facsimile message and the control is returned to ITU-T H.245.

In data channel #1, the channel according to T.30 Annex C is allocated, opened and sent for the transmission of the facsimile encoded data.

2c) Each data block of data channel #1 is handed over to the multiplex layer identified as facsimile information data block;

2d) All information data blocks are multiplexed by the sending communication terminal equipment with other information data blocks for voice, video, data, etc., if they exist, via the multiplex layer of operating in accordance with a PSTN/mobile picture telephone protocol—according to ITU-T H.223 and H.245. They are then transmitted to the receiving communication terminal equipment and demultiplexed therein;

1e) The demultiplexed information data blocks are respectively assigned to a matching layer allocated to the information data type of video, voice, data or facsimile. The facsimile matching layer forwards the facsimile information blocks to the data channel #1 of the receiver for application of a facsimile decompression method according to ITU-T T.4, T.6, T.30, and the decompressed facsimile information is output or further-processed.

In addition to identification for facsimile information data blocks and facsimile control data blocks, an identification for audio (voice), video, data and control information data blocks is also provided in an alternate preferred embodiment. Preferably, the facsimile transmission protocol according to ITU-T T.4, T.6, ITU-T T.030 and the PSTN/mobile picture telephone protocol according to ITU-T H.223 adapted with ITU-T H.245 are employed.

A facsimile device for implementing the novel method includes an image scanner, a printer, a fax modem, a communication controller operating in accordance with to ITU-T T.30 and H.245, a multimedia multiplexer (H.223) and a facsimile encoder/decoder (ITU-T T.4, T.6, T.81, T.82) as well as an audio input/output, such as, for example, loudspeaker and microphone. Additionally, an audio signal encoder/decoder is provided for compression and decompression of audio input/output signals. A PC or a data display can also be employed.

Depending on the specific structure, the novel communications method makes use of some special characteristics of the Telefax Group 3 Standard and of the pending PSTN/Mobile Picture Telephone Standards ITU-T H.324, ITU-T H.223 and ITU-T H.245 of the ITU. Specifically, this includes the use of the full-duplex protocol to be introduced according to "Packet Media Mode" of the ITU PSTN/mobile picture telephone, whose protocol layers can be derived from FIGS. 1 and 2. This is a two-layer multiplex method. The physical connection is realized in the physical layer PS. This contains V.8, V.8bis and V.34 which is employed for connection setup and modem communication. In the lower layer ML (multimedia packet multiplex layer, Multiplex Layer, layer 2 according to OSI reference model) of the multiplex layer H.223 according to H.223, information packets are identified according to the various information types (video, audio/voice, data, facsimile data, facsimile control, multimedia terminal control) and multiplexed in different length. Additionally, an adaptation layer ADL for "Facsimile Group 3" (facsimile Gr3 Adaption Layer) sees to the protocol adaptation of the facsimile communication such as, for example, the error correction mode at the lower multiplex layer ML. As a result thereof, the multiplex layer H.223 is completely independent of the application protocols. (for example, facsimile).

Figure 2:
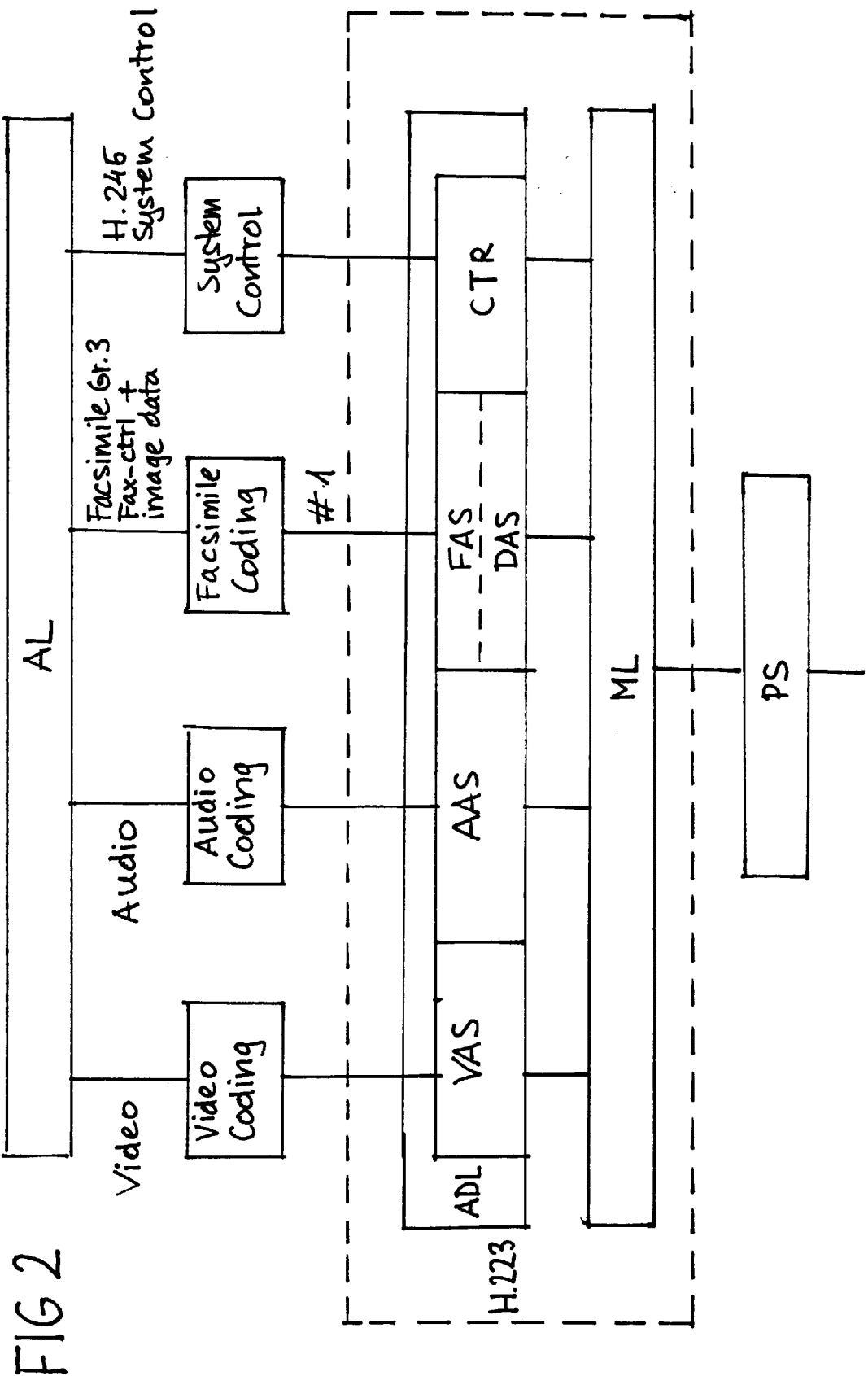
FIG. 2 illustrates the protocol layers of the multimedia facsimile device and method.

FIG. 1 also shows the physical layer PS subordinated to the multiplex layer, as well as the individual types of the adaptation layer ADL. Specifically, these are the Video Adaption Layer VAS, Data Adaption Layer DAS, Audio Adaption Layer AAS and Facsimile Adaption Layers FAS1 for facsimile data and FAS2 for facsimile control, as well as following, allocated "Higher Layers" for video coding, for data coding, for audio coding and facsimile coding. As needed, the latter are fashioned as coder/decoder layers and connect the adaptation layer ADL to an Application Layer AL. The protocols in accordance with H.223 contain the physical layer PS and the individual adaption layers ADL. FIG. 1 shows a data channel #1 for the transmission of facsimile data from the facsimile adaption layer FAS1 to the application layer AL and a data channel #2 for the transmission of facsimile control commands from the facsimile adaption layer FAS2 to the application layer AL. FIGS. 1 and 2 also show a specific data channel for the transmission of H.245 system control data, System Control, from the system adaption layer CTR to the application layer AL.

The protocol layers of the multimedia facsimile according to FIG. 2 differ from those set forth in FIG. 1 only in that, due to the full-duplex transmission to the fax codec Facsimile Coding, only one data channel #1 is provided and, likewise, only one facsimile adaption layer FAS is provided. It is also that the transmission rate of the telefax group 3 can be increased by optional addition of high-speed modems, up to 33.6 kBit/s according to ITU-T V.34.

Further, the invention is promoted in that the current norming of speech encoders with very low bit rates leads to speech encoders with transmission rate of 5–8 kBit/s (ITU-T G.723, ITU-T G.729, ITU-T G.dsvd) dedicated for picture telephony in the public switched telephone network in ITU-T. These require a protected transmission type, for example, in accordance the "Packet Media Multiplexing" method (ITU-T H.223).

Upon incorporation as needed of the afore-mentioned features, the methods described in the current ITU-T recommendations can be expanded such that the above-described required functionality, namely the transport of facsimile images via PSTN/mobile picture telephone protocols, can be effectively met.

Further, the unique system enables the simultaneous transmission of multimedia information (for example, voice, facsimile image, data, moving picture). With this system, for example, a written telefax message can be simultaneously commented upon by a spoken message during the facsimile transmission. This offers an introduction or an additional explanation or potentially serves as spoken commentary about the individual paragraphs of a received telefax message.

FIG. 3 illustrates a facsimile device, and an H.324 multimedia platform for implementation of the unique method described herein. This comprises an image scanner 14, a printer 13, a modem 10, a communication controller 2 and 7 operating in accordance with ITU-T T.30 and H.245, H.223. Additionally, a multimedia multiplexer/demultiplexer 8 and a facsimile encoder/decoder, FAX codec 4, as well as an audio input/output means 11 such as, for example, loudspeaker or, respectively, microphone are employed. An audio signal encoder/decoder AUDIO-CODEC 1 (ITU-T G.723, G.729 or G.dsvd) is provided for compression and decompression of audio input/output signals. FIG. 3 also illustrates a network interface via which the facsimile and multimedia device is connected to a communication network PSTN via the modem 10 as well as via telephone 16. Further, a switch 17 simplifies a monomedia audio mode is provided in the illustrated exemplary embodiment. A connection setup circuit 9 is also shown.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

What is claimed is:

1. A method for transmitting facsimile-encoded information from a sending multimedia-capable communication terminal equipment to a multimedia-capable receiving communication terminal equipment comprising the steps of:
   a) compressing digital facsimile input information in the sending communication terminal equipment into facsimile encoded information and facsimile control information;
   b) dividing the facsimile encoded information and facsimile control information into data blocks in a first adaption layer for facsimile data and in a second adaption layer for the facsimile control information;
   c) transferring each facsimile data block to a multiplex layer, each block identified as a facsimile information control block or a facsimile information data block;
   d) multiplexing information data blocks in the sending multi-media communication terminal equipment with other information data blocks within the multiplex layer and transmitting the data blocks to the receiving multi-media communication terminal equipment and demultiplexing the data blocks;
   e) assigning the demultiplexed information data blocks to an adaption layer allocated to an information data type, wherein two facsimile adaptation layers respectively forward facsimile information blocks or facsimile control blocks for facsimile decompression; wherein
   said method employs the full-duplex protocol according to "Packet Media Mode" of the ITU PSTN/mobile picture telephone (ITU-T H.324).

2. A method for transmitting facsimile-encoded information from a sending multimedia-capable communication terminal equipment to a multimedia-capable receiving communication terminal equipment comprising the steps of:
   a) compressing digital facsimile input information in the sending communication terminal equipment into facsimile encoded information and facsimile control information;
   b) dividing the facsimile encoded information and facsimile control information into data blocks in a first adaption layer for facsimile data and in a second adaption layer for the facsimile control information;
   c) transferring each facsimile data block to a multiplex layer, each block identified as a facsimile information control block or a facsimile information data block;
   d) multiplexing information data blocks in the sending multi-media communication terminal equipment with other information data blocks within the multiplex layer and transmitting the data blocks to the receiving multi-media communication terminal equipment and demultiplexing the data blocks;
   e) assigning the demultiplexed information data blocks to an adaption layer allocated to an information data type, wherein two facsimile adaptation layers respectively forward facsimile information blocks or facsimile control blocks for facsimile decompression; wherein
   said method employs the full-duplex protocol according to "Packet Media Mode" of the ITU PSTN/mobile picture telephone (ITU-T H.32P/M series of ITU-T recommendations).

* * * * *